(12) United States Patent
Voegeli

(10) Patent No.: US 6,558,209 B1
(45) Date of Patent: May 6, 2003

(54) BOAT AUXILIARY DRIVE MECHANISM

(76) Inventor: Ronald C. Voegeli, P.O. Box 3479, Breckenridge, CO (US) 80424

( * ) Notice: Subject to any disclaimer, the term of this patent is extended or adjusted under 35 U.S.C. 154(b) by 0 days.

(21) Appl. No.: 10/066,710

(22) Filed: Feb. 6, 2002

(51) Int. Cl.[7] .............................................. B63H 23/10
(52) U.S. Cl. ............................................ 440/4; 440/75
(58) Field of Search .................................. 440/3, 4, 75

(56) References Cited

U.S. PATENT DOCUMENTS

| | | |
|---|---|---|
| 1,754,133 A | 4/1930 | Van Der Ploeg |
| 1,905,145 A | 4/1933 | Carter |
| 3,170,434 A | 2/1965 | Ewing |
| 4,406,633 A | 9/1983 | Hamm |
| 5,453,035 A | 9/1995 | Jenkins |
| 5,616,056 A * | 4/1997 | Meissner ....................... 440/3 |
| 5,618,211 A * | 4/1997 | Bourgoin ....................... 440/4 |
| 6,017,289 A * | 1/2000 | Gaffney ....................... 475/346 |
| 6,033,271 A | 3/2000 | Schäfer |

FOREIGN PATENT DOCUMENTS

GB    2 028 747    3/1980

* cited by examiner

*Primary Examiner*—Stephen Avila
(74) *Attorney, Agent, or Firm*—Burns, Doane, Swecker & Mathis, L.L.P.

(57) ABSTRACT

A boat drive system includes a transmission unit, a propeller shaft, and an auxiliary drive unit for driving the propeller shaft in the event of a failure of the main engine and/or the transmission unit. The auxiliary drive unit includes a housing slidably supported by the transmission unit, and the housing carries a motor and a drive sprocket driven by the motor. The drive sprocket is hollow, to enable the propeller shaft to extend therethrough. The drive sprocket includes axially facing teeth which are engageable with axially facing teeth of a coupling sleeve affixed to the propeller shaft.

16 Claims, 6 Drawing Sheets

BOAT AUXILIARY DRIVE MECHANISM

BACKGROUND OF THE INVENTION

The present invention relates to an auxiliary drive mechanism for propelling a boat in the event of failure of a main engine or transmission.

It is common for motor-powered boats to provide an auxiliary drive mechanism for propelling the boat if there should occur a failure of the main engine or the transmission. Auxiliary drive mechanisms now available are often called "get home drives" and are usually powered by an auxiliary power unit such as an engine driven generator. The means of power are either from the electricity produced by the generator or through hydraulics such as by an auxiliary hydraulic pump mounted to the generator's engine. The main function of the auxiliary drive unit is to rotate the propeller shaft, usually at a reduced speed, but sufficient to propel the boat to port. The usual method of attaching the auxiliary drive mechanism to the propeller shaft involves the use of belts, chains, or gears which must be disengaged during periods when the propeller shaft is being driven by the main engine to avoid being subjected excessive wear.

A drive connection between the auxiliary motor and the propeller shaft can be achieved by the use of a manually attachable belt or chain interconnecting the auxiliary motor (mounted to the boat hull) and a pulley or sprocket affixed to the propeller shaft. Alternatively, gearing could be used to transmit the drive fro the auxiliary motor to a gear affixed to the propeller shaft, wherein gears sets are manually rotated into meshing engagement.

The need to make the connection of the drive linkage manually is inconvenient. Moreover, in order to perform the task, it is necessary for an operator to enter the engine room, which can be difficult if the boat is still moving through the water, because the propeller will be turning the propeller shaft.

Additional shortcomings include the need to keep the belts, chains or gears in alignment as the engine mounts, the engine beds, and the shaft bearing undergo wear. Moreover, with the auxiliary motor attached the boat hull, the transmission of power via chains, belts or gears will result in the application of a side load to the propeller shaft, due to the pull of the belt or chain, or the push of the gears. Such side thrust can be effectively resisted by arranging an additional bearing on the propeller shaft, but this adds to the expense and complexity of the mechanism. Also, the bearing will be in constant rotation when the propeller shaft is rotating, and thus constitutes another part which will wear out and require replacement.

Auxiliary drive mechanisms have been proposed which can be automatically engaged, e.g., by means of a clutch mechanism. For example, U.S. Pat. No. 6,033,271 discloses an auxiliary drive for a propeller shaft 4 which includes an electric motor 42 mounted to the boat hull and connected by way of a clutch 43 to a transmission 5. The transmission 5 is connected to a cogwheel 6 which is mounted on a sleeve 7 arranged coaxially with the propeller shaft 4. The sleeve 7 engages a clutch 8 which is connected to the propeller shaft 4 by means of a flange 9. Such a mechanism involves the use of a expensive clutch mechanisms and may impart a an undesirable side thrust to the propeller shaft.

It would be desirable to provide an auxiliary drive mechanism which does not impart a side thrust to the propeller shaft.

It would also be desirable to provide such a mechanism can be mechanically activated and which has no need of a clutch.

SUMMARY OF THE INVENTION

One aspect of the present invention involves a boat drive system which includes a transmission unit adapted to be mounted to a boat hull. A propeller shaft is connected to the transmission unit to be driven thereby. A coupling member is mounted coaxially with the propeller shaft for rotation therewith and includes a first rotation transmission structure disposed on an end of the coupling member facing away from the transmission unit. An auxiliary drive unit is provided for driving the propeller shaft. The auxiliary drive unit includes a housing mounted for movement relative to the transmission unit in a direction parallel to a longitudinal axis of the propeller shaft. An auxiliary motor is mounted on the housing. A drive wheel is rotatably mounted to the housing and is operably connected to the auxiliary motor to be driven thereby. The drive wheel is hollow, with the propeller shaft extending therethrough. The drive wheel includes a second rotation transmission structure facing the first rotation transmission structure. An actuating mechanism is provided for moving the auxiliary unit in a direction parallel to the axis selectively toward and away from the transmission unit, to bring the first and second rotation transmitting structures into and out of rotation transmitting connection.

The invention also pertains to the auxiliary drive unit itself. The auxiliary drive unit includes a housing having first and second end walls interconnected by a sidewall. An auxiliary motor is attached to the exterior of the first end wall adjacent an upper end thereof. The motor includes a motor shaft extending into the housing. A drive wheel is disposed at a lower end of the housing and extends between the first and second end walls and is mounted therein for rotation about an axis oriented parallel to the motor shaft. The drive wheel is hollow and includes an axial end having an annular row of axially facing teeth arranged around the axis of the drive wheel. A power transfer mechanism interconnects the motor shaft and the drive wheel.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
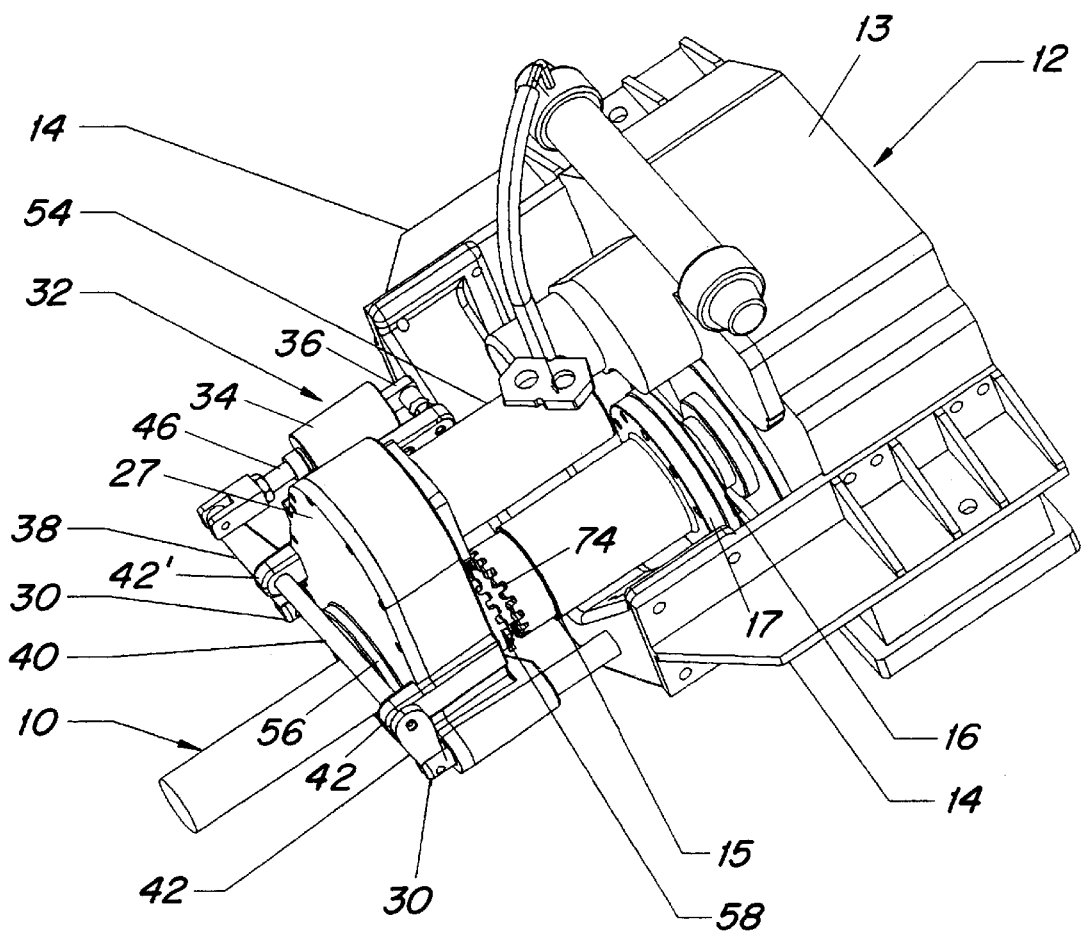
FIG. 1 is a top perspective view of a conventional transmission unit, and an auxiliary drive unit according to the present invention, the auxiliary drive unit being out of driving relationship with a propeller shaft.
Figure 2:
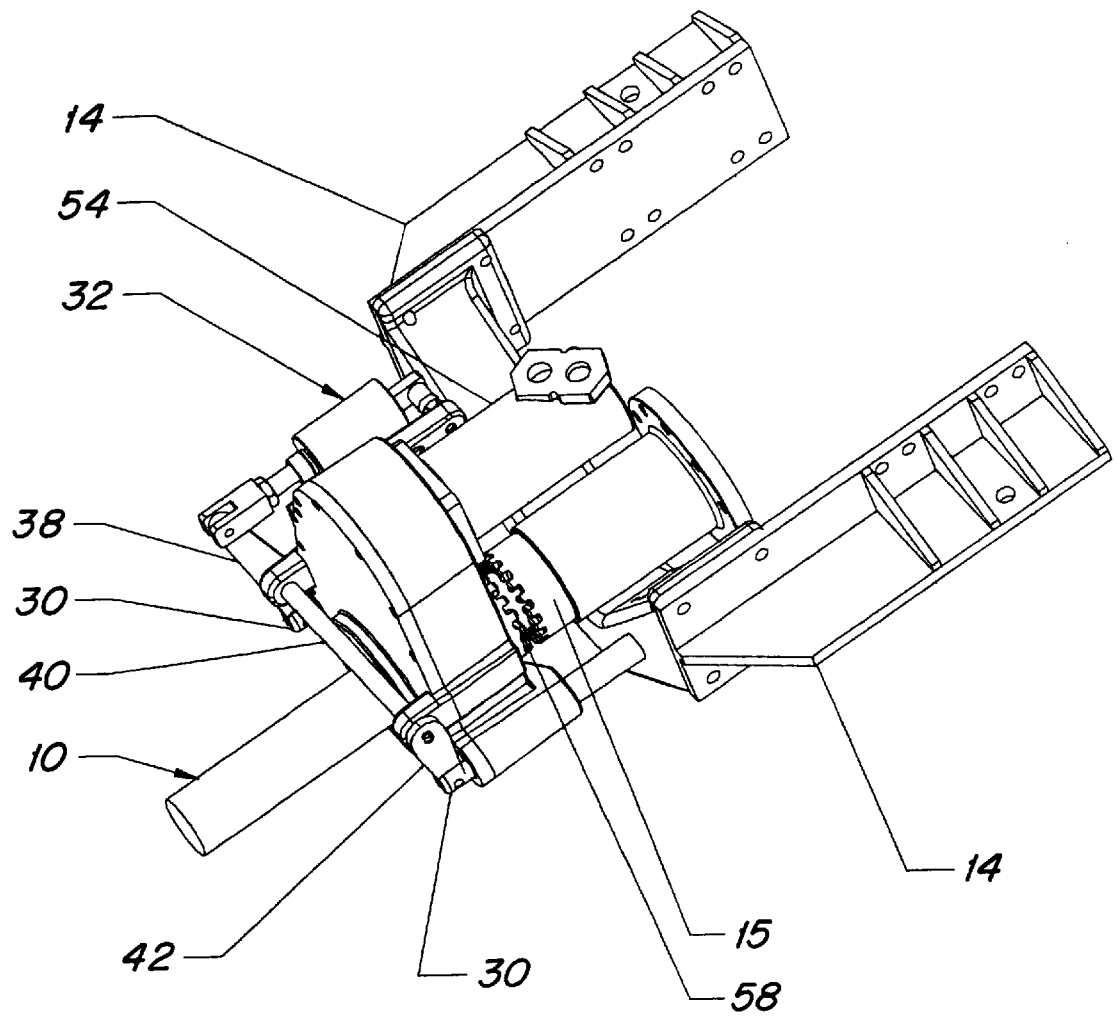
FIG. 2 is a view similar to FIG. 1, with a portion of the transmission unit removed.
Figure 3:
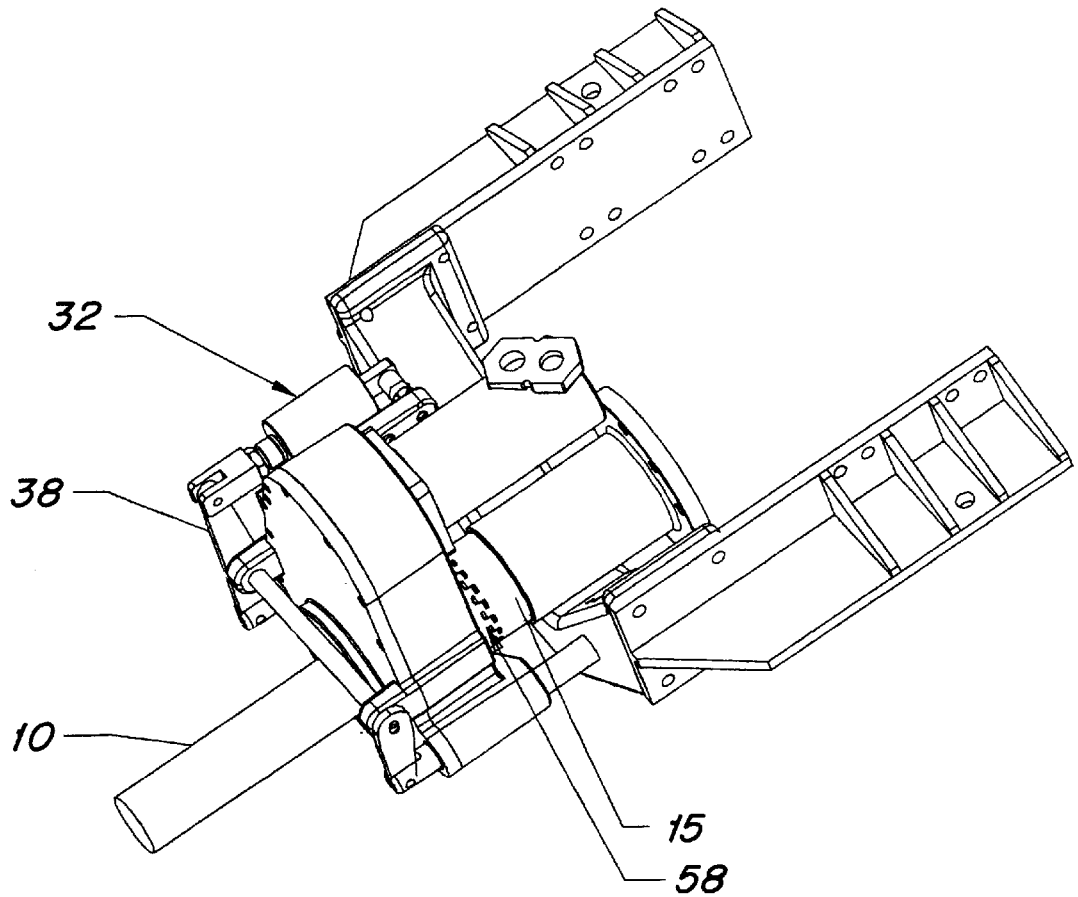
FIG. 3 is a view similar to FIG. 2 showing the auxiliary drive unit in driving relationship with the propeller shaft.

Depicted in FIG. 1 is a propeller shaft 10 connected to a conventional transmission unit 12 which is driven by a main engine (not shown). The transmission unit includes a main portion 13 and removable mounting rails 14 for mounting the transmission unit to a boat hull (not shown). The propeller shaft 10 is fixed to a coaxial coupling sleeve 15 which includes a flange 17 connected to an output flange 16 of the transmission unit to enable the transmission unit to drive the propeller shaft.

Figure 4:
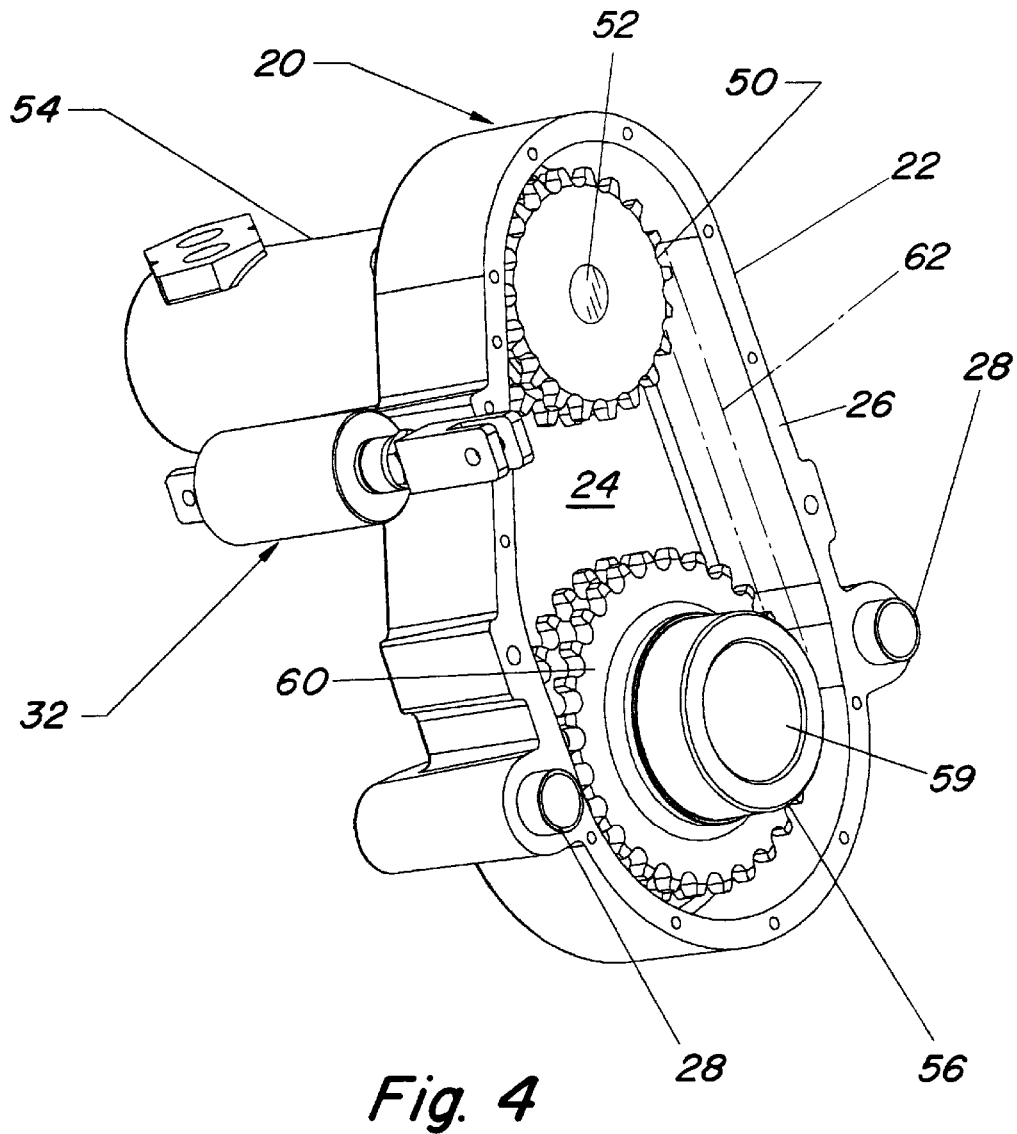
FIG. 4 is a front perspective view of the auxiliary drive unit, with a front wall thereof removed to expose the interior of the unit.
Figure 5:
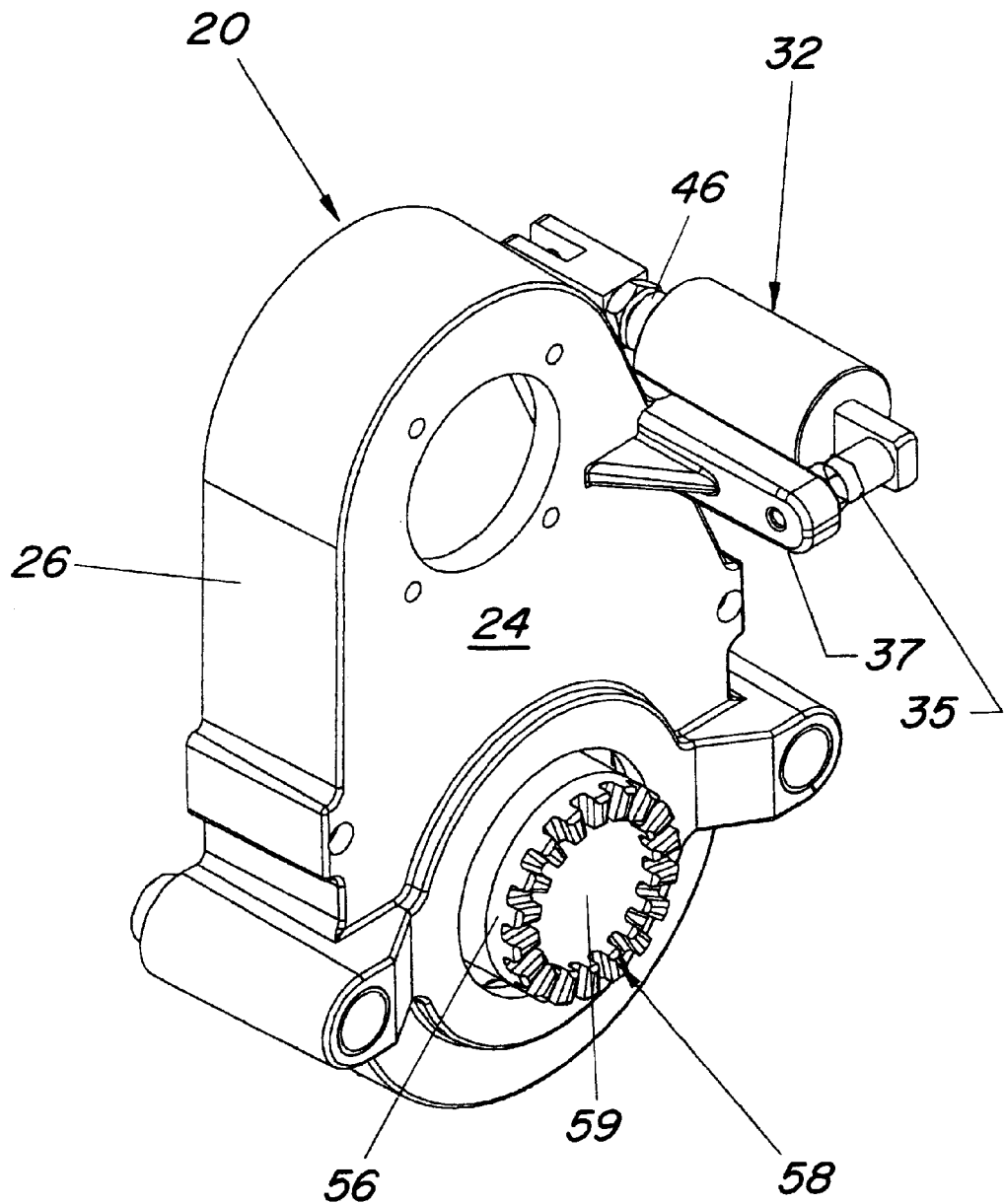
FIG. 5 is a rear perspective view of the auxiliary drive unit with an auxiliary motor removed.

To propel the boat in the event of a failure of the main engine or the transmission unit, an auxiliary drive unit 20 is provided which is supporting by the transmission unit 12 for sliding movement relative thereto in a direction parallel to the propeller shaft. With reference to FIGS. 4 and 5, the auxiliary unit 20 has an outer housing 22 which includes a rear end wall 24, a side wall 26, and a front end wall 27. The side wall 26 carries a pair of horizontal guide bushings 28 disposed on opposite sides of the housing and oriented parallel to each other and to the propeller shaft 10. Those guide bushings 28 are slidable on respective guide rails 30, 30' that are affixed to the mounting rails 14 of the transmission unit 12.

Sliding of the auxiliary unit 20 along the guide rails 30, 30' is effected by an actuating mechanism which includes a power driven actuator of any suitable type, such as an electric actuator or a fluid-powered ram 32 (i.e., hydraulic or pneumatic). A rear end 36 of the actuator is mounted by a pivot pin 35 to a bracket 37 affixed to the rear wall 24 of the housing 22. A front end of the actuator 32 is pivoted to the upper end of a shift arm 38. A lower end of the shift arm 38 is pivotably mounted to one of the guide rails 30', and an intermediate portion of the shift arm 38 receives one end of a shift bar 40 which is affixed to the housing 22 by a pair of ears 42, 42'. The ears 42, 42' are affixed to the front wall 27. The shift arm 38 receives the end of the shift bar 40 with a relatively loose fit. An opposite end of the shift bar 40 is loosely received in the upper end of an arm 44, a lower end of the arm 44 being pivotably mounted to the guide rail 30.

It will be appreciated that by retracting a piston rod 46 of the actuator cylinder 34, the auxiliary drive unit 20 will be shifted toward the transmission unit 12, and when the piston rod 46 is extended, the auxiliary drive unit will be shifted away from the transmission unit, for reasons to be explained.

Disposed inside the housing 22 of the auxiliary unit 20 adjacent an upper end thereof is a motor sprocket 50 (see FIG. 4 which shows the housing 22 with its front wall 27 removed). The motor sprocket 50 is mounted on an end of a motor shaft 52 that protrudes into the housing from an auxiliary motor 54 affixed to the exterior of the rear wall 24. The motor 54 is preferably electric, but could be hydraulic or pneumatic for example. The motor shaft 52 extends parallel to the propeller shaft 10.

Disposed in the housing 22 adjacent a lower end thereof is a hollow drive wheel in the form of a drive sprocket 56 which is mounted in the front and rear end walls 27, 24 for rotation about an axis oriented parallel to the propeller shaft 10. A rear end of the drive sprocket 56 projects through a hole formed in the rear end wall 24 and includes an axially facing end surface formed with a rotation transmission structure in the form of an annular row of axially projecting teeth 58 (see FIG. 5) for reasons to be explained. The drive sprocket 56 contains a center hole 59 which is of larger diameter than, and receives, the propeller shaft 10.

Affixed to the drive sprocket is a driven sprocket 60 which is connected to the motor sprocket 50 by a drive chain 62 (shown in phantom lines in FIG. 4), to define a power transfer mechanism between the auxiliary motor and the drive sprocket. The relative diameters of the motor sprocket 50 and the driven sprocket 60 are selected to provide a desired speed ratio. Instead of a chain-and-sprocket type of power transfer mechanism, any suitable mechanism could be employed, such as gears or belts/pulleys.

Arranged coaxially around the propeller shaft 10 and affixed thereto is the coupling sleeve 15, whose flange 17 is attached to the flange 16 of the transmission unit 12, as noted earlier. A front end of the coupling sleeve 15 includes an axially facing surface having a rotation transmission structure in the form of an annular row of axially projecting teeth 74 formed therein. Those teeth 74 are spaced from the center axis of the propeller shaft 10 by the same distance as the teeth 58 of the drive sprocket 56, so as to be interlockable therewith when the auxiliary unit 20 is displaced toward the transmission unit 12.

If desired, the housing 22 can be sealed and filled with lubricant. That is, the openings in the housing which admit the motor shaft 52 and the drive sprocket 56 would be provided with suitable seals.

In practice, during normal operation, the transmission unit 12 drives the coupling sleeve 15 through the coupling between the flanges 17, 16, and the coupling sleeve 15 drives the propeller shaft 10. In this state, the auxiliary drive unit 20 is situated so that the drive sprocket 56 is out of engagement with the coupling sleeve 15, and the auxiliary motor 54 is deactivated. In the event of a main engine failure, or a failure of the transmission unit, the transmission unit is decoupled from the engine shaft (not shown), e.g., by actuation of a standard clutch (not shown). Also, the actuator 32 is actuated to retract the piston rod 46 and shift the auxiliary unit toward the transmission unit, thereby bringing the teeth 58 of the drive sprocket 56 into meshing engagement with the teeth 74 of the coupling sleeve in order to establish a rotary drive connection between the drive sprocket 56 and the coupling sleeve 15. By then operating the auxiliary motor 54, the drive sprocket 56 is driven and, in turn, drives the coupling sleeve 15. Rotation from the coupling sleeve 15 is transmitted to the propeller shaft to propel the boat.

Figure 6:
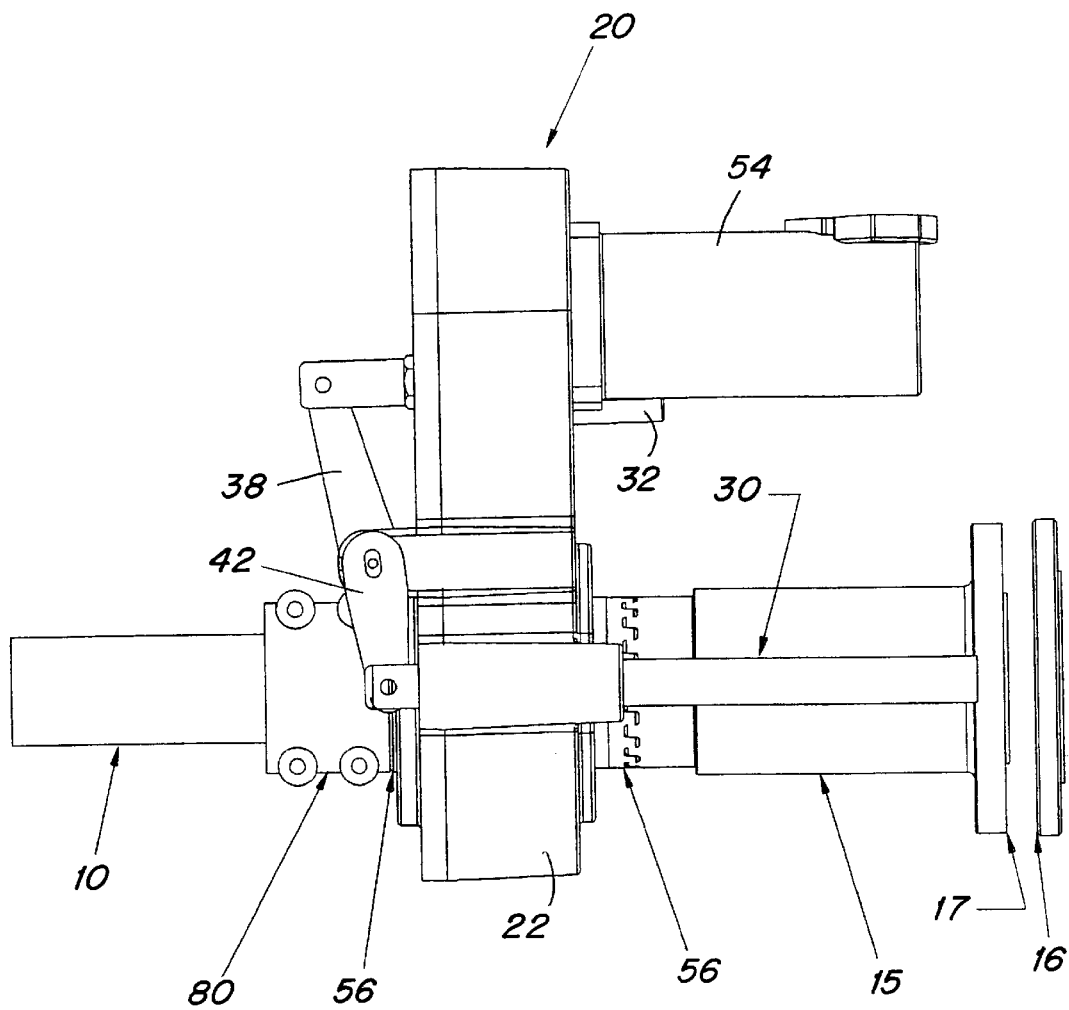
FIG. 6 is a side elevational view of the auxiliary drive unit arranged for driving the propeller shaft in the event of a failure of the transmission unit.

In the event of a failure of the transmission unit 12, the flange 17 can be detached from the flange 16, and the propeller shaft 10 can be shifted away from the transmission unit 12, along with the coupling sleeve so that the teeth of the drive sprocket 56 engage the teeth of the coupling sleeve, as shown in FIG. 6. Then, a clamp collar 80 can be attached to the propeller shaft 10 so as to abut against a front end of the drive sprocket 56 and effectively lock the drive sprocket to the coupling sleeve. Then, the auxiliary motor is activated to drive the propeller shaft.

It will be appreciated that since the auxiliary motor 54 is mounted on the auxiliary drive unit, and the rotary drive is transmitted to the propeller shaft by teeth 58, 74 arranged coaxially relative to the propeller shaft, there will be no side load applied to the propeller shaft. Also, since the auxiliary drive unit is supported by the transmission unit, the teeth of the drive sprocket 56 will always be substantially aligned with the teeth 74 of the coupling sleeve 15.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A boat drive system comprising:
   a transmission unit adapted to be mounted to a boat hull;

a propeller shaft connected to the transmission unit to be driven thereby;

a coupling member mounted for rotation with the propeller shaft and including a first rotation transmission structure disposed on an end of the coupling member facing away from the transmission unit;

an auxiliary drive unit for driving the propeller shaft comprising:
- a housing mounted for movement relative to the transmission unit in a direction parallel to a longitudinal axis of the propeller shaft,
- an auxiliary motor mounted on the housing,
- a drive wheel rotatably mounted to the housing and operably connected to the auxiliary motor to be driven thereby, the drive wheel being hollow, with the propeller shaft extending therethrough, the drive wheel including a second rotation transmission structure facing the first rotation transmission structure, and
- an actuating mechanism for moving the auxiliary drive unit parallel to the axis selectively toward and away from the transmission unit, to bring the first and second rotation transmitting structures into and out of rotation transmitting connection.

2. The boat drive system according to claim 1 wherein the auxiliary drive unit further includes a power transfer mechanism interconnecting the auxiliary motor and the drive wheel for establishing a selected speed ratio.

3. The boat drive system according to claim 2 wherein the auxiliary motor is mounted adjacent an upper end of the housing, and the drive wheel is mounted adjacent a lower end of the housing.

4. The boat drive system according to claim 3 wherein the drive wheel comprises a drive sprocket, and the power transfer mechanism comprises a first sprocket affixed to the drive sprocket, a second sprocket affixed to an output of the auxiliary motor, and a chain interconnecting the first and second sprockets.

5. The boat drive system according to claim 1 wherein the first and second rotation transmission structures include respective annular rows of teeth facing one another.

6. The boat drive system according to claim 1 wherein the housing of the auxiliary drive unit is supported by the transmission unit.

7. The boat drive system according to claim 6 wherein the transmission unit includes a pair of guide rails extending parallel to the axis of the propeller shaft, the housing of the auxiliary drive unit carrying guide bushings slidably mounted on respective ones of the guide rails.

8. The boat drive system according to claim 7 wherein the actuating mechanism is operably connected between the guide rails and the housing of the auxiliary unit.

9. The boat drive system according to claim 1 wherein the actuating mechanism is operably connected between the transmission unit and the housing of the auxiliary drive unit.

10. The boat drive system according to claim 9 wherein the actuating mechanism includes a power driven actuator.

11. The boat drive system according to claim 1 wherein the drive wheel includes a circular through-hole extending therethrough and having a diameter larger than a diameter of the propeller shaft.

12. A boat drive system comprising:

a transmission unit adapted to be mounted to a boat hull;

a propeller shaft connected to the transmission unit to be driven thereby;

a coupling member mounted coaxially with the propeller shaft for rotation therewith and including a first annular row of teeth disposed on an end of the coupling member, the teeth of the first row of teeth projecting in a direction away from the transmission unit;

an auxiliary drive unit for driving the propeller shaft comprising:
- a housing supported by the transmission unit for movement relative thereto in a direction parallel to a longitudinal axis of the propeller shaft,
- an auxiliary motor mounted on the housing,
- a drive wheel rotatably mounted to the housing and operably connected to the auxiliary motor by a power transfer mechanism to be driven thereby, the drive wheel being hollow, with the propeller shaft extending therethrough, the drive wheel including a second annular row of teeth projecting toward the first row of teeth;
- a power-driver actuating mechanism connected between the transmission unit and the housing for moving the auxiliary unit parallel to the axis selectively toward and away from the transmission unit, to bring the first and second row of teeth into and out of rotation transmitting connection.

13. An auxiliary drive unit adapted to be mounted on a transmission unit of a boat drive system, the auxiliary drive unit comprising:

a housing having first and second end walls interconnected by a side wall;

an auxiliary motor attached to an exterior of the first end wall adjacent an upper end thereof and including a motor shaft extending into the housing, a drive wheel disposed at a lower end of the housing and extending between the first and second end walls and mounted therein for rotation about an axis oriented parallel to the motor shaft, the drive wheel being hollow and including an axial end having an annular row of axially facing teeth arranged around the axis of the drive wheel; and a power transfer mechanism interconnecting the motor shaft and the drive wheel.

14. The auxiliary drive unit according to claim 13 wherein the drive wheel comprises a drive sprocket, and the power transfer mechanism comprises first and sprockets affixed to the motor shaft and the drive sprocket, respectively, and a chain interconnecting the first and second sprockets.

15. The auxiliary drive unit according to claim 13 further including a power-driven actuating mechanism mounted on the housing and adopted to be connected to a boat transmission unit.

16. The auxiliary drive unit according to claim 13 wherein the housing includes a pair of guide bushings disposed on opposite sides of the housing and including respective through-holes extending parallel to the motor shaft.

* * * * *